A. A. SMITH.
ASPARAGUS HARVESTING TOOL.
APPLICATION FILED MAY 9, 1910.
986,773.
Patented Mar. 14, 1911.
2 SHEETS—SHEET 2.
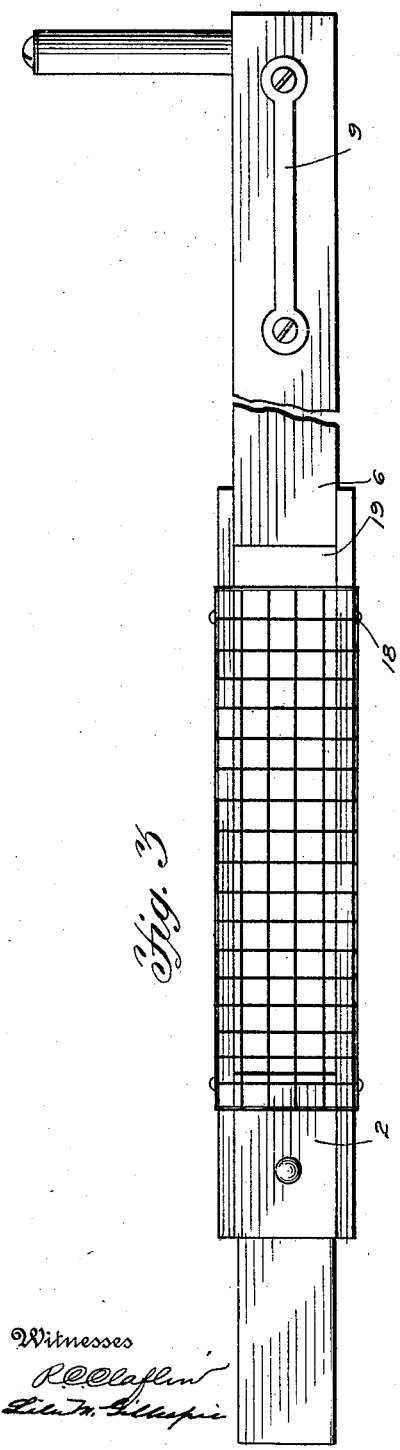
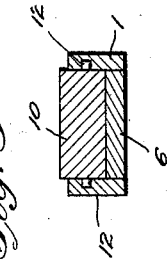
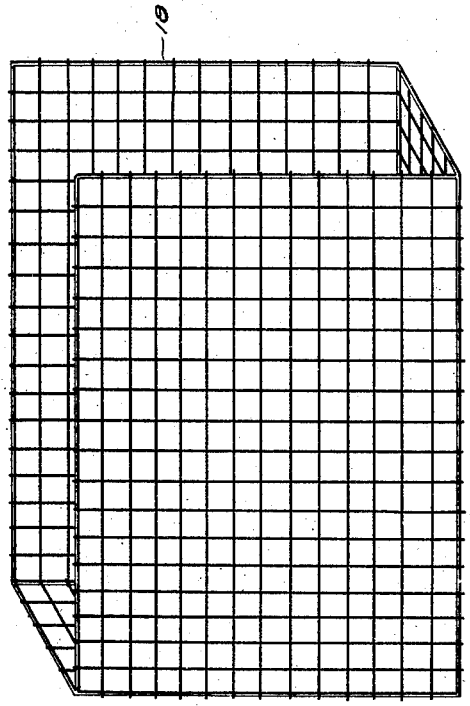
Inventor
A. A. Smith

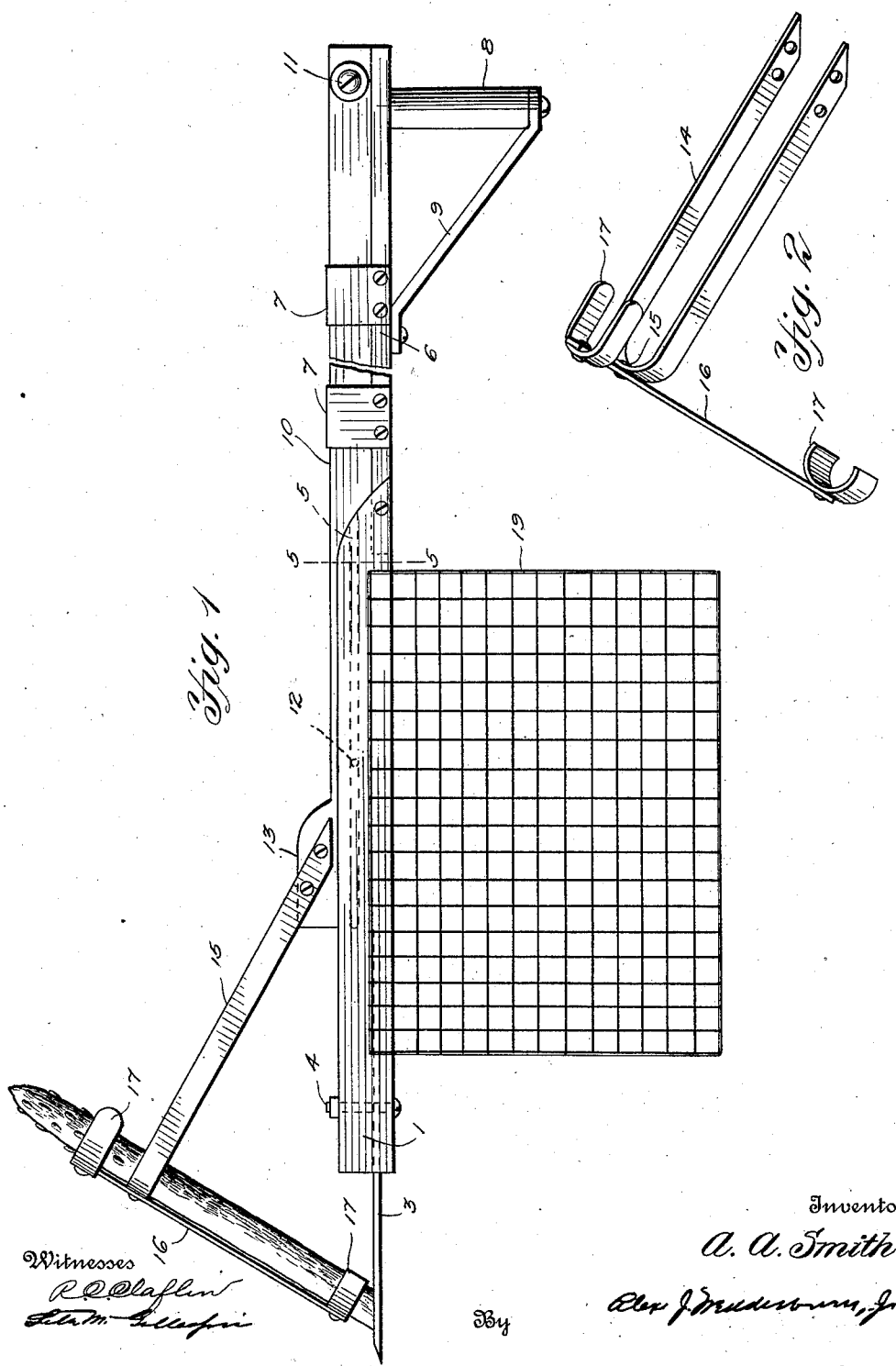

UNITED STATES PATENT OFFICE.

ASA A. SMITH, OF MALAGA, NEW JERSEY.

ASPARAGUS-HARVESTING TOOL.

986,773.  Specification of Letters Patent. Patented Mar. 14, 1911.

Application filed May 9, 1910. Serial No. 560,369.

*To all whom it may concern:*

Be it known that I, ASA A. SMITH, citizen of the United States, residing at Malaga, in the county of Gloucester and State of New Jersey, have invented certain new and useful Improvements in Asparagus-Harvesting Tools, of which the following is a specification.

This invention relates to improvements in asparagus harvesting tools and refers particularly to a device comprising cutting means and a receptacle for receiving the cut asparagus.

One of the objects of the invention is the construction of a tool whereby asparagus may be quickly severed from its roots and quickly placed into a receiving basket mounted on the frame of the cutting tool.

With the above and other objects in view the invention comprises certain combinations, constructions and arrangements of parts, clearly described in the following specification and clearly illustrated in the accompanying drawings, forming a part of this specification, wherein, Figure 1 is a side elevation of the improved tool, Fig. 2 is a detail perspective view of a holder, Fig. 3 is a bottom plan view of the improved tool, Fig. 4 is a detail perspective view of the receiving basket, and Fig. 5 is a detail transverse sectional view taken on line 5—5 of Fig. 1.

Referring to the accompanying drawings illustrating the invention 1 denotes the side members of the forward part of the frame, which are secured to a bottom member 2, on which a severing knife 3 is secured by the bolt 4. The inner wall surfaces of the side members 1 are provided with longitudinally extending grooves 5, one of which is indicated in dotted lines in Fig. 1. To the rear ends of the side members 1 a handle frame is secured. This handle frame consists of the bottom member 6, which is provided with guides 7 and with a laterally extending handle 8, suitably braced to the bottom member 6 by the angle brace 9. Between the guides 7 and the side members 1 the operating bar 10 moves. This bar, which is preferably made of wood, is provided with a handle 11, whereby it may be reciprocated on the bottom member 6 and between the guides 7 and the side members 1. The bar 10 is provided with pins 12, only one of which is indicated, which fit in the grooves 5, so that the bar 10 will be held in place.

The bar 10 is provided with an offset 13 which is connected to the legs 14 of the U-shaped support 15, the middle portion of which is secured to the rod 16, the upper and lower terminals of which are provided with the U-shaped devices 17, which are adapted to engage the stock of the asparagus to be cut.

A basket or receptacle 18 is secured to the side members 1 to receive cut asparagus, which can fall through the opening 19, between the ends of the forward bottom member 2 and the rear bottom member 6. The rear end of the basket or receptacle 19 is open so that the material, consisting of cut asparagus and dirt can be emptied.

To operate the harvesting tool the clips of devices 17 are placed against an asparagus stock and the knife 3 is forced by the operator exerting pressure on the handle 8, so that the asparagus is severed. After this is done the asparagus is withdrawn over the bottom member 2 and the opening 19, so that it will fall into the basket or receptacle 18. By shaking the cut asparagus in the receptacle or basket the dirt around the same may be removed without difficulty.

By means of the improved cutter or asparagus harvester a worker can quickly sever asparagus from their roots without enduring the usual back strains, as the device enables a worker to stand erect while harvesting the asparagus.

Having described my invention I claim:—

1. An asparagus harvesting tool comprising a knife, means for holding the knife having side members, a receptacle secured thereto, and means adapted to engage an asparagus slidable between the side members, whereby a cut asparagus can be placed in the receptacle.

2. In an asparagus harvesting tool, side members, a knife secured between the side members, a bar slidable between the side members, said side members having grooved walls, pins on the bar slidable on the grooved walls, a receptacle supported by the side members, a handle frame secured to the side members, a handle on the handle frame, a handle on the bar, guides on the handle frame for the bar, a support on the bar, and an asparagus holder mounted on the support.

3. An asparagus gatherer consisting of a frame having an opening thereon intermediate of its ends, a basket secured to said frame communicating with said opening, a cutter secured to the lower end of said frame, a channel formed on said frame, a sliding gathering member movable toward said basket mounted in said channel, grooves in the sides of said channel, and pins on said sliding member operating in said grooves.

4. An asparagus gatherer consisting of a frame having an opening thereon intermediate of its ends, a basket secured to said frame communicating with said opening, a cutter secured to the lower end of said frame, a channel formed on said frame, a sliding gathering member movable toward said basket mounted in said channel, grooves in the sides of said channel, pins on said sliding member operating in said groove.

5. An asparagus gatherer consisting of a frame having an opening therein intermediate of its ends, a basket secured to said frame communicating with said opening, a cutter secured to said frame, a channel formed on said frame, a sliding member mounted in said channel, grooves in the sides of said channel, pins on said sliding member in said groove, and a stalk engaging member movable toward said basket and operated by said sliding member.

6. An asparagus gatherer consisting of a frame having an opening therein intermediate of its ends, a basket secured to said frame communicating with said opening, a cutter secured to the lower end of said frame, a channel formed on said frame, a sliding member mounted in said channel, grooves in the sides of said channel, pins on said sliding member in said groove, a stalk engaging member operated by said sliding member, said stalk engaging member movable toward said basket and consisting of a body portion and supporting arms.

7. An asparagus gatherer consisting of a frame having an opening therein intermediate of its ends, a basket secured to said frame communicating with said opening, a cutter secured to the lower end of said frame, a channel formed on said frame, a sliding member mounted in said channel, grooves in the sides of said channel, pins on said sliding member in said groove, a stalk engaging member movable toward said basket and operated by said sliding member, said stalk engaging member consisting of a body portion and supporting arms, said arms being located on opposite portions of said body.

8. An asparagus gatherer consisting of a frame having an opening therein intermediate of its ends, a basket secured to said frame communicating with said opening, a cutter secured to the lower end of said frame, a channel formed in said frame, a sliding member mounted in said channel, grooves in the sides of said channel, pins on said sliding member in said groove, a stalk engaging member movable toward said basket and operated by said sliding member, said stalk engaging member consisting of a body portion and supporting arms, said arms being located on opposing portions of said body, and means for securing said body to said sliding member.

9. An asparagus gatherer consisting of a frame having an opening intermediate of its ends, a basket secured to said frame communicating with said opening, a cutter secured to said frame, a channel formed in said frame, a sliding member mounted in said channel, grooves in the sides of said channel, pins on said sliding member in said groove, a stalk engaging member operated by said sliding member, said stalk engaging member movable toward said basket consisting of a body portion and supporting arms, said arms being located on opposing portions of said body, means for securing said body to said sliding member, said means consisting of a V-shaped loop, said cutter being removably secured to said frame, handles on said frame and said sliding member for operating said asparagus gatherer.

In testimony whereof I affix my signature in presence of two witnesses.

ASA A. SMITH.

Witnesses:
WILLIAM ADAMS,
AMOS J. BUTTRICK.

Copies of this patent may be obtained for five cents each, by addressing the "Commissioner of Patents, Washington, D. C."